United States Patent [19]

Schulze

[11] 4,268,343

[45] May 19, 1981

[54] MACHINE FOR WORKING ON A WEB OF MATERIAL BY MEANS OF A WELDING TOOL

[75] Inventor: Ehrhart Schulze, Fellbach, Fed. Rep. of Germany

[73] Assignee: Karl Heinz Stiegler, Stuttgart, Fed. Rep. of Germany

[21] Appl. No.: 14,317

[22] Filed: Feb. 23, 1979

[30] Foreign Application Priority Data

Mar. 9, 1978 [DE] Fed. Rep. of Germany ....... 2810127
Mar. 9, 1978 [DE] Fed. Rep. of Germany ....... 2810204

[51] Int. Cl.³ ............................................. B32B 31/00
[52] U.S. Cl. ...................................... 156/361; 74/69; 83/298; 83/312; 83/324; 156/515
[58] Field of Search .................... 156/361, 515; 83/74, 83/312, 313, 298, 299, 324, 363, 364, 367, 38; 226/40-42, 28-31; 74/69

[56] References Cited

U.S. PATENT DOCUMENTS

| | | | |
|---|---|---|---|
| 2,052,263 | 8/1936 | Whiteley | 226/40 X |
| 2,067,513 | 1/1937 | Talbot | 74/69 UX |
| 2,211,418 | 8/1940 | Hallden | 74/69 UX |
| 2,632,421 | 3/1953 | Perkins | 74/69 X |
| 2,947,184 | 8/1960 | Olson | 83/324 X |
| 3,308,701 | 3/1967 | Frohling | 83/324 |
| 3,745,864 | 7/1973 | Watson | 83/363 X |
| 3,793,927 | 2/1974 | Emond | 83/313 X |
| 3,797,368 | 3/1974 | Martelli | 83/299 X |
| 4,020,722 | 5/1977 | Byrt et al. | 83/313 X |
| 4,104,723 | 8/1978 | Tokuno et al. | 83/74 X |

*Primary Examiner*—David A. Simmons
*Attorney, Agent, or Firm*—Thomas R. Morrison

[57] ABSTRACT

A first drive apparatus for a thermoplastic web operates at an automatically adjusted, substantially constant, speed to deliver the thermoplastic web to a welding tool which rotates with a second pair of rollers. The second pair of rollers are driven at a cyclically variable speed in which the minimum speed is attained at the time when the welding tool is in contact with the thermoplastic web. An automatic control system adjusts the speed of the feed rollers to correspond to the speed of the welding tool at the instant during which welding is performed. Adjustment of the ratio of the maximum to the minimum speed of the cyclically variable speed of the second pair of rollers controls the length of thermoplastic web between welds without changing the speed of the driving input to the second pair of rollers.

21 Claims, 5 Drawing Figures

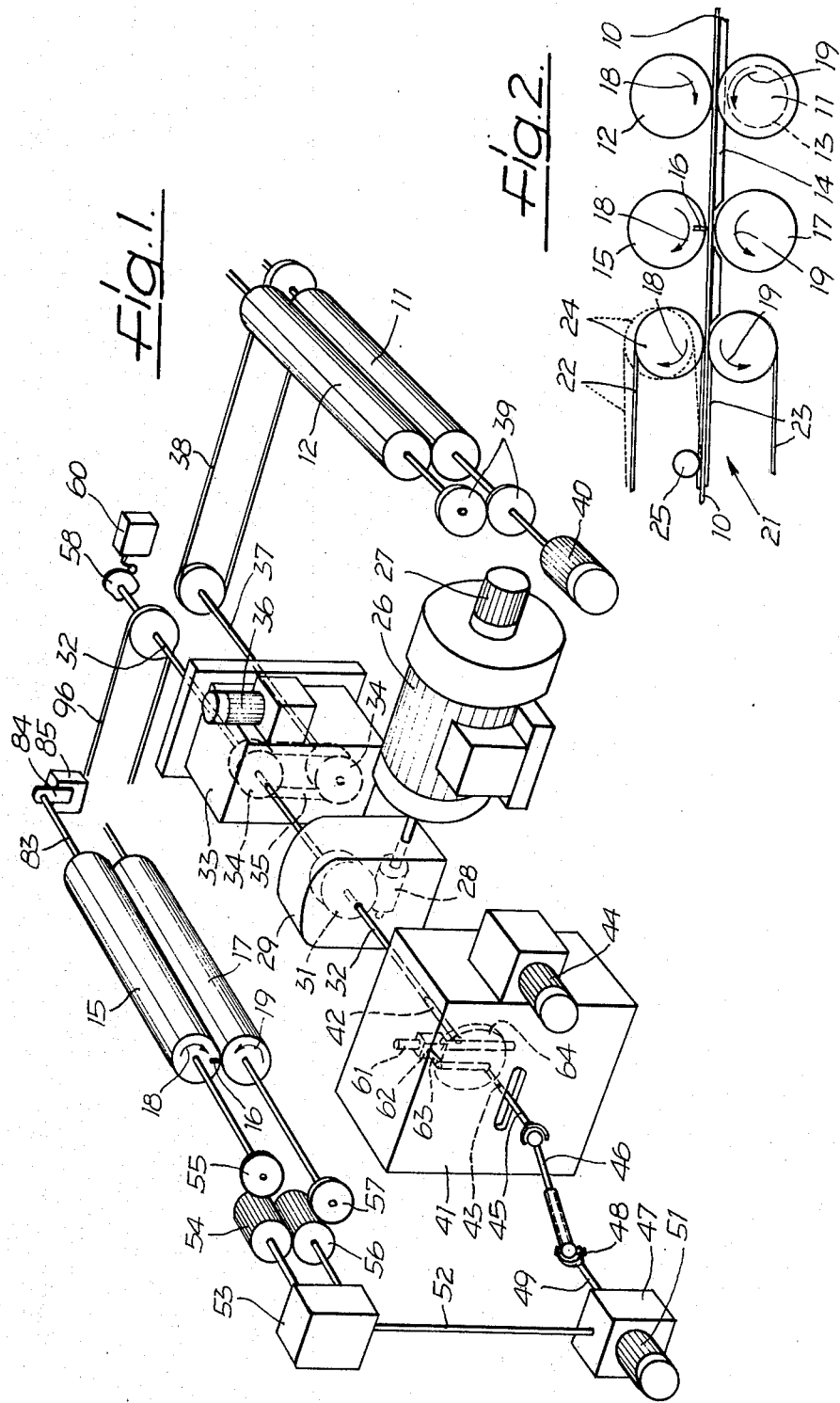

MACHINE FOR WORKING ON A WEB OF MATERIAL BY MEANS OF A WELDING TOOL

BACKGROUND OF THE INVENTION

The present invention relates to a machine for handling and separation welding of a web of material. More particularly, the present invention relates to a machine for the manufacturing of plastic bags from a web of thermoplastic synthetic material which has been folded once around one of its longitudinal axes, in which the welding tool separates the individual bags from each other and thereby simultaneously produces the side seams of the bags.

From West German Pat. No. 1,479,807 a machine is known which uses a transfer gearing consisting of a universal joint shaft in which the pivot pins fastened to the two ends of the shaft are perpendicular to each other. In this way uniform rotation of a drive shaft is transformed into non-uniform rotation of a driven shaft of the transfer gearing. By changing the inclination of the universal joint shaft with respect to the drive shaft, the non-uniformity of rotation of the driven shaft of the transfer gearing can be adjusted. In this apparatus, the web of material is driven at a constant speed. When the inclination of the universal joint shaft is zero, the non-uniformity of the rotation of the driven shaft of the transfer gearing is also zero. If the universal joint shaft is operated with zero inclination, the longest sections of web are fed past the welding apparatus between welds thus producing the widest bags. Narrower bags are produced by increasing the speed of rotation of the welding tool and thus of the transfer gearing by changing the inclination of the universal joint shaft so that its minimum speed corresponds to the speed of the web of material. In order to produce shorter sections it is therefore necessary to simultaneously adjust the non-uniformity of the rotary motion produced at the driven shaft of the transfer gearing and increase the speed of rotation thereof. The non-uniformity of the rotation of the driven shaft of the transfer gearing subjects the drive to loads due to the accelerations and decelerations cyclically produced thereby. This additional load increases with an increase in the non-uniformity. Since, however, the accelerations also increase with the speed of rotation of the transfer gearing, the drive of the machine is subjected to a double load by the combination of these two factors, namely the increase in the uniformity and the increase in the speed of rotation.

The use of such a universal joint shaft has the disadvantage that the driven shaft carries out the cyclically repeated non-uniform movement twice during each rotation of the drive shaft. In order therefore to drive the welding tool via a universal joint shaft, the drive must rotate at half the speed of rotation of the welding tool, which is disadvantageous. Furthermore, the possibility of changing the spacing between the welds is relatively limited.

OBJECTS AND SUMMARY OF THE INVENTION

It is an object of the present invention to provide a machine which exerts as little load as possible on the drive despite the non-uniformity of the rotation of the driven shaft of the transfer gearing.

This and other objects are achieved in accordance with the invention by a second controllable gearing with continuously variable transmission ratio for driving of the web of material. In this way the transfer gearing always rotates at the same speed of rotation at all non-uniformities which can be set and therefore, for instance, for all bag widths which can be set. In this way the loading of the drive by the combined action of the increasing non-uniformity and the increasing speed of rotation is avoided in simple fashion.

In one embodiment of the invention, the transfer gearing and the second gearing are both driven by a common drive through a worm gearing. Interposition of the worm gearing between drive and transfer gearing substantially reduces the load on the drive resulting from non-uniformity of rotation of the driven shaft of the transfer gearing.

In another advantageous embodiment, a motor with variable speed of rotation, preferably a DC motor, is employed as a drive motor. By varying the drive speed for a given length of sections separated by welding from the web of material, the welding time can be adjusted as desired to adapt to different web materials.

In one particularly advantageous embodiment of the invention, a rotating slot and crank mechanism is used as transfer gearing. In this way, particularly if the slot arm of the slot and crank mechanism is connected with the uniformly rotating shaft of the drive and the crank shaft is connected with the welding tool, a substantially greater possibility of adjustment of the length of the sections between two weldings is obtained.

The invention will be explained in detail with reference to the drawings in the following description of one embodiment of a machine in accordance with the invention.

BRIEF DESCRIPTION OF THE DRAWINGS

FIG. 1 is a simplified perspective view showing the essential parts of a web handling and welding apparatus according to the present invention, in which the machine frame is omitted from and the locations of certain parts are moved from their correct positions in order to avoid obscuring overlap of other parts whose functions are important to an understanding of the apparatus;

FIG. 2 is a simplified schematic side view of the feed rollers, the welding rollers and the belt conveyor of the apparatus of FIG. 1;

DETAILED DESCRIPTION OF THE PREFERRED EMBODIMENT

Figure 4:
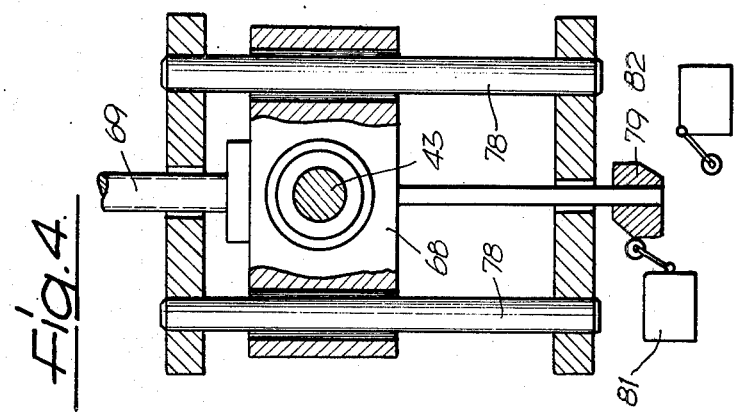
FIG. 4 is a cross section along the line IV—IV of FIG. 3.

Referring to FIG. 2, there is shown a web of material 10 fed between two feed rollers 11 and 12. Lower feed roller 11 has annular grooves 13 therein into which the individual webs of a guide grid 14 engage for guiding web 10 to a welding roller 15 which bears a welding tool 16 extending lengthwise along its surface and which is arranged above a mating roller 17. Rollers 15 and 17 rotate at a non-uniform angular velocity in the direction indicated by arrows 18 and 19 respectively. The drive of rollers 15 and 17 is adjusted so that the welding tool 16 contacts the web of material 10 when the circumferential speed of welding tool 16 reaches its minimum value. Feed rollers 11 and 12 are driven in the direction of arrows 18 and 19 with a circumferential speed which equals the minimum speed of the welding tool 16. Downstream of rollers 15 and 17, there is provided a conventional belt conveyor 21 which consists of upper and lower conveyor belts 22 and 23 respectively, the lower and upper courses of which respectively form a feed gap for the section of the web of material cut off by welding tool 16. Upper and lower conveyor belts 22 and 23 may each consist of a plurality of parallel belts. Upper guide roller 24 adjacent welding rollers 15 and 17 is supported for upward and downward movement, also in known manner, and moves downward whenever welding tool 16 contacts the web of material 10. Belt conveyor 21 is driven with a somewhat greater speed than the peripheral speed of feed rollers 11 and 12 so that the section of the web of material which has been cut off by welding tool 16 is pulled away with increased speed from the web of material 10 immediately after it has been separated. As soon as the front edge of the web of material 10 reaches the conveyor gap of belt conveyor 21, guide roller 24 is again moved upward by a suitable cam control so that the lower courses of the conveyor belt 22 and the upper courses of the conveyor belt 23 form a feed angle which opens up from a guide roller 25.

Referring now also to FIG. 1, rollers 11, 12, 15 and 17 are driven by a common variable speed DC motor 26 whose speed can be set to a desired value. A tachometer 27 measures the speed of DC motor 26. DC motor 26 drives a worm 28 of a worm gearing 29 whose worm gear 31 is fastened to a worm-gear shaft 32 extending through it. One end of worm-gear shaft 32 is connected to a controllable ratio gearing 33 which consists, as shown in dashed line in FIG. 1, of two pairs of toothed cone pulleys 34 and a laminated chain 35. The transmission ratio of controllable ratio gearing 33 is adjustable to a desired value by means of a servomotor 36. A driven shaft 37 of controllable ratio gearing 33 is connected via a toothed-belt drive 38 to lower feed roller 11, which is, in turn, connected via gear wheels 39 to upper feed roller 12 for equal and opposite rotation thereof. A tachogenerator 40 produces an electrical signal indicative of the speed of rotation of feed rollers 11 and 12.

The other end of worm-gear shaft 32 is connected with a transfer gearing 41 which converts uniform rotary motion into non-uniform rotary motion in which the angular velocity changes cyclically during each revolution in accordance with an adjustable function. Transfer gearing 41, shown in detail in FIGS. 3 and 4, includes a rotating slot and crank mechanism having a slot-arm shaft 42 connected to worm gear shaft 32 and a crank shaft 43 which is adjustable by a servomotor 44 in a plane containing the slot-arm shaft 42. Crank shaft 43 is connected to a driven shaft 45 of the transfer gearing 41. Driven shaft 45 is connected via a telescoping universal joint shaft 46 to a bevel gearing 47 (FIG. 1). In order that universal joint shaft 46 transmit the rotary movement of driven shaft 45 as accurately as possible within its adjustment range to bevel gearing 47, pivot pins 48 firmly attached to universal joint shaft 46 are arranged in a common plane and bevel gearing 47 is so arranged that the angle between the axis of universal joint shaft 46 on the one hand and the axes of driven shaft 45 and input shaft 49 of bevel gearing 47 are equal when crankshaft 43 is in its central position. A tachogenerator 51 on the bevel gearing 47 produces an electrical signal indicative of the angular velocity of transfer gearing 41.

Bevel gearing 47 is connected via a shaft 52 and a second bevel gearing 53 to a gear wheel 54 which is in engagement with two gear wheels 55 and 56. Gear wheel 55 is connected to the shaft of welding roller 15 and gear wheel 56 is connected via another gear wheel 57 to the shaft of mating roller 17 so that rollers 15 and 17 are driven in opposite directions indicated by arrows 18 and 19 at the same speed.

As can be noted from FIG. 1, worm gear shaft 32 passes through controllable ratio gearing 33 and there drives members which must be adjusted in cadence with the cycle of welding tool 16. Within this cycle, a conventional cam disc (not shown) or other apparatus moves guide roller 24 (FIG. 2) of belt conveyor 21 up and down at the proper times. Toothed belt drive 96 is provided to drive such a cam disc (not shown). A cam 58 on the extension of the worm-gear shaft 32 actuates a switch 60 which inactivates servomotor 36 when welding tool 16 is in its welding position. This prevents the speed of the web of material 10 being changed at the instant of welding.

A vane 84, fastened to a shaft 83 which is rigidly connected with the welding roller, is rotated into a position in which it can influence a signal generator 85 by induction or change of capacitance when welding tool 16 is in welding position. When thus influenced, signal generator 85 produces an electric signal indicating that welding tool 16 is in the welding position shown in FIG. 1.

Figure 3:
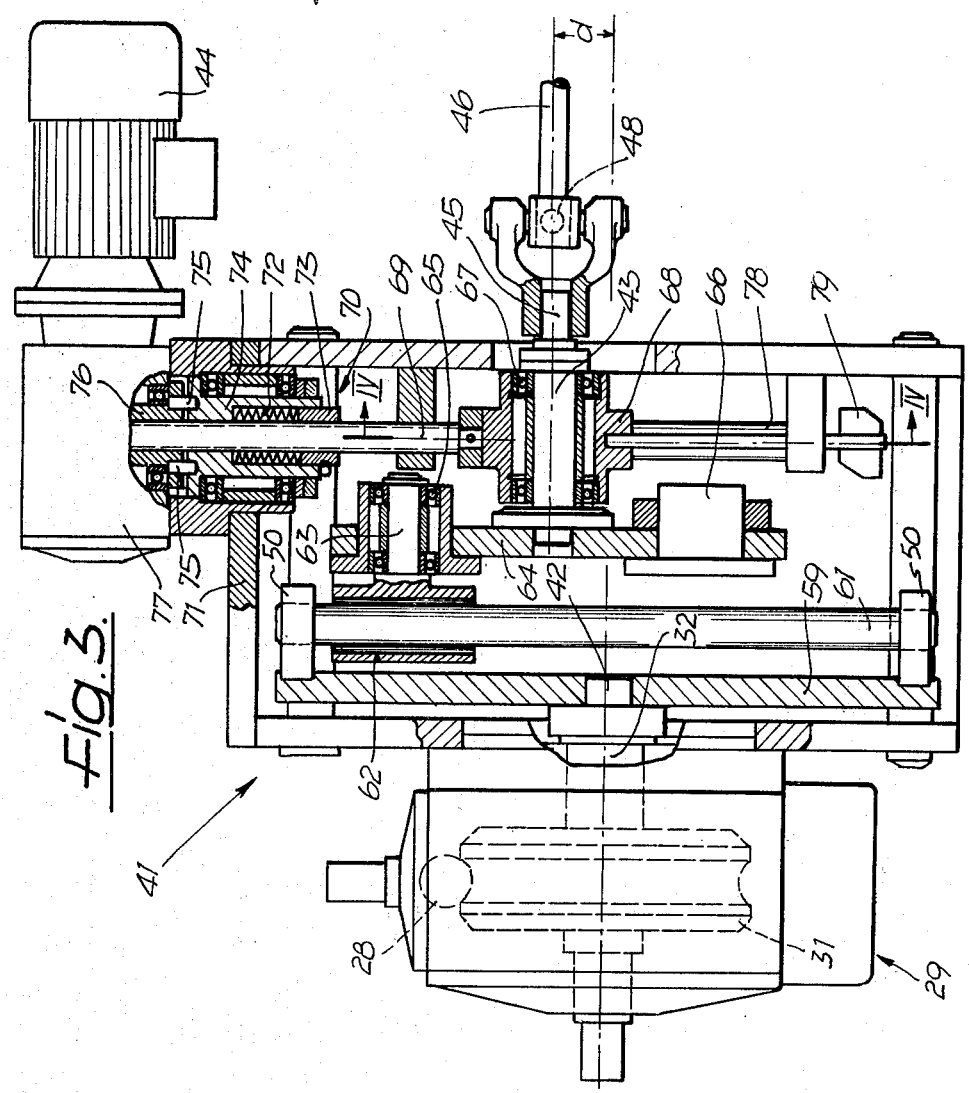
FIG. 3 is an axial section through the transfer gearing of FIG. 1.

Referring now also to FIGS. 3 and 4, slot-arm shaft 42, which is rigidly connected to worm gear shaft 32, bears a disk 59 concentrically fastened to it. A guide rod 61, forming the slot arm of the slot and crank mechanism, is rigidly affixed at its ends to disk 59, by end supports 50 which support guide rod 61 a fixed distance from disk 59 at right angles to slot arm shaft 42, the axes of guide rod 61 and slot arm shaft 42 lying in a common plane. A slide block 62 is slideably disposed on guide rod 61. A crank pin 63, fastened to slide block 62, supports a ball bearing 65 in a disk 64. Disk 64 performs the function of a crank of the slot and crank mechanism. A counterweight 66 is fastened on disk 64 diametrically opposite crank pin 63 to counter-balance slide block 62 and crank pin 63. Disk 64 is rigidly fastened to crankshaft 43 which is rotatably supported by a ball bearing 67 in a bearing 68. Bearing 68 is fastened to an adjustment spindle 69 which has an external thread onto which is screwed a two-piece adjustment nut 70 which is supported in a turnable but axially non-displaceable manner in a frame 71 of the transfer gearing 41. Adjustment nut 70 has two subnuts 73 and 74 connected to each other for rotation and clamped without play by means of an interposed disk spring 72. Adjusting subnuts 73, 74 are connected by driver pins 75 to a worm gear 76 of a worm gearing 77 whose worm can be driven by servomotor 44 to adjust, as required, the distance d between the axes of slot-arm shaft 42 and crankshaft 43 and thus adjust the non-uniformity of rotation of driven shaft 45.

As can be noted from FIGS. 3 and 4, the crankshaft bearing 68 is further guided by two parallel guide rods 78. A cam 79, cooperating with two limit switches 81 and 82, moves with crankshaft bearing 68 in order to determine the upper and lower limit positions of bearing 68.

Figure 5:
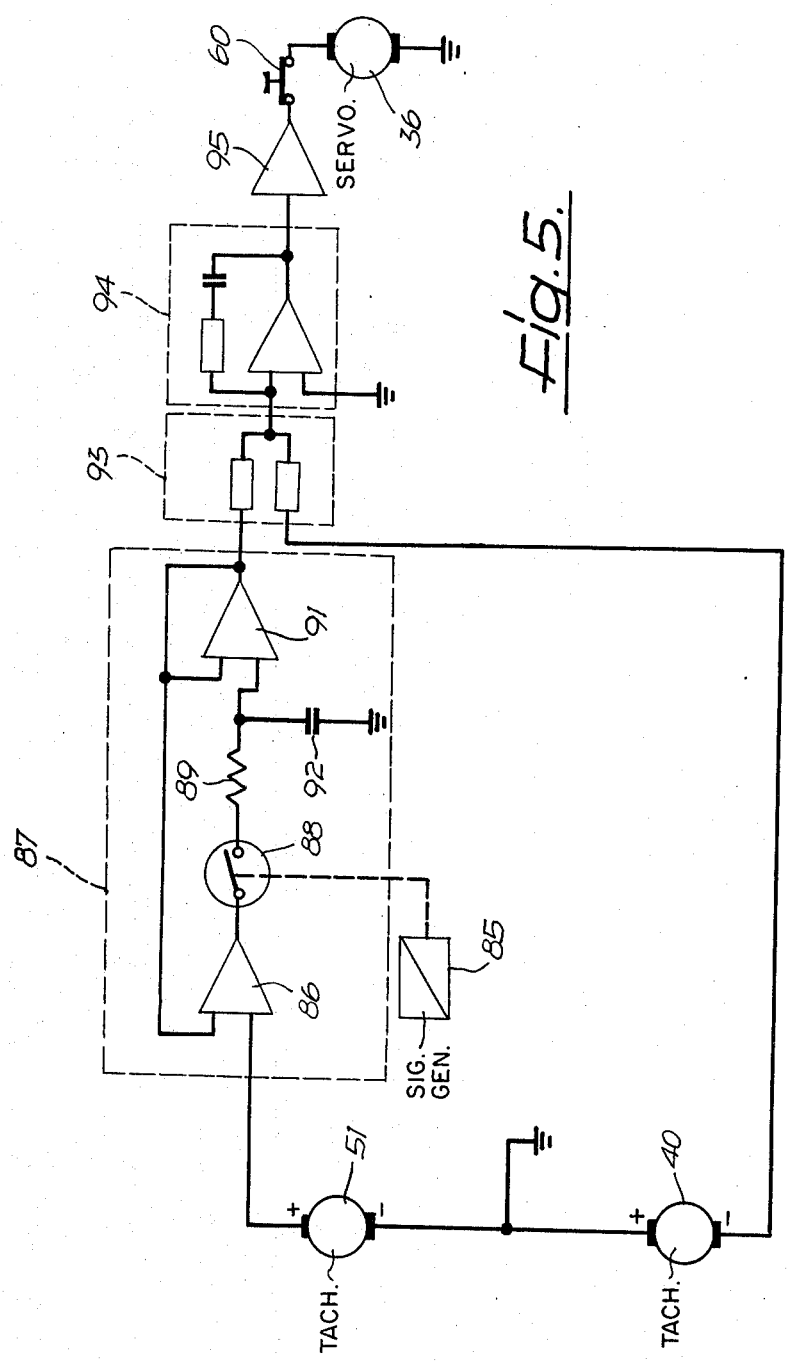
FIG. 5 is a block diagram of a control circuit for the embodiment of FIG. 1.

Referring now to FIG. 5, an automatic control circuit for the apparatus described above is shown. A positive terminal of DC tachogenerator 51 is connected to the noninverting input of a first operational amplifier 86 of a scanning and holding circuit 87. The output of operational amplifier 86 is connected via an electronic switch 88 of any convenient type, such as, for instance, a field effect transistor, through a resistor 89 to the noninverting input of a second operational amplifier 91. The input of operational amplifier 91 is also connected to a storage capacitor 92 which stores voltages fed thereto via electronic switch 88. The output of operational amplifier 91, which is also the output of scanning and holding circuit 87, is connected to one input of an addition member 93 whose second input is connected to the negative terminal of DC tachogenerator 40. The negative terminal of DC tachogenerator 40 and the positive terminal of DC tachogenerator 40 are connected to ground. Therefore the positive voltage from DC tachogenerator 51 is algebraically added in addition member 93 to the negative voltage from DC tachogenerator 40 thus forming a voltage proportional to the difference between the two DC tachogenerator outputs. The difference voltage from addition member 93 is fed to an inverting input of another operational amplifier 94. The output of operational amplifier 94 is fed through a power amplifier 95 and switch 60 to servomotor 36 of controllable ratio gearing 33. Electronic switch 88 is connected to the output of signal generator 85 and is closed by a signal therefrom generated by the position of vane 84 (FIG. 1) when welding tool 16 is in the welding position.

During operation, motor 26 operates at a constant speed which can be adjusted as desired. Motor 26 drives feed rollers 11 and 12 through worm gearing 29 and gearing 33 and welding roller 15 and mating roller 17 through gearing 41. Depending on the distance d between the axes of slot-arm shaft 42 and crank shaft 43, the nonuniformity of the rotary movement of the crank-shaft 43 and thus of the welding roller 15 can be adjusted within given limits. The distance d can be adjusted by servomotor 44. The distance d (FIG. 3) is adjustable from a smaller value at which the axes of shafts 42 and 43 are almost aligned to a larger value, such as shown in FIG. 3 at which the misalignment is relatively large. Welding tool 16 is disposed on roller 15 such that rollers 15 and 17 are at their minimum speed in the welding position shown in FIGS. 1 and 2 and move away accelerated from this position. This aids in loosening welding tool 16 from the web of material 10 since sticking of the web of material 10 to welding tool 16 could not otherwise be avoided. For this reason distance d is not set to zero since welding tool 16 would then rotate with uniform velocity which, as stated, may lead to the web of material 10 sticking to welding tool 16 with resultant damage.

The speed of feed rollers 11 and 12 is adjusted so that the web of material 10 moves during the welding process at the same speed as welding tool 16. Constrollable ratio gearing 33 performs this adjustment under control of the control circuit of FIG. 5. Scanning and holding circuit 87, which acts here as analog storage, stores a voltage in storage capacitor 92 proportional to the speed of welding tool 16 only during the instant when welding tool 16 contacts the web of material 10 during the welding process. When vane 84 fastened to shaft 83 causes signal generator 85 to produce an output signal when welding tool 16 is in the welding position, electronic switch 88 is closed to apply the voltage existing at that instant at the output of operational amplifier 86 to storage capacitor 92. The position of vane 84 can be accurately adjusted by a suitable arrangement of the vane 84 on the shaft 83 or the location of the sensor of signal generator 85. The voltage stored in capacitor 92 and at the high-ohmic input of operational amplifier 91 produces a corresponding output which is fed to addition member 93. This voltage is compared with the voltage of tachogenerator 40, which corresponds to the speed of rotation of feed rollers 11 and 12. Algebraic addition of the two oppositely polarized voltages of tachogenerators 40 and 51 in addition member 93 produces an output voltage representative of the difference between the absolute values of these voltages. The difference voltage is inverted in operational amplifier 94, amplified in power amplifier 95 and fed to servomotor 36 which, as a result of this voltage, adjusts the transmission ratio of controllable ratio gearing 33 to minimize the voltage difference measured in addition member 93. Between power amplifier 95 and servomotor 36, switch 60 is actuated into the open position by cam 58 when welding tool 16 is in the welding position so as to avoid the speed of feed rollers 11 and 12 being changed during welding.

In the theoretical limit case, if the center-to-center distance d between the axes of the shafts 42 and 43 is zero, welding tool 16 would rotate with uniform velocity. Upon an increase of the distance d, the non-uniformity of the circumferential speed of welding tool 16 is increased, i.e. the difference between the maximum and minimum circumferential speeds of welding tool 16 is increased. Since, however, the speed of travel of the web of material 10 is at all times automatically adjusted to equal the minimum speed of welding tool 16, the distance between the welding points on the web of material 10 decreases with an increase in d. If the machine described above is used for the manufacture of plastic bags, the width of the bags to be welded can therefore be adjusted by changing the distance d.

If one changes the speed of DC motor 26 without changing distance d the speed of drive rollers 11 and 12 remain automatically synchronized to the minimum speed of welding tool 16. Thus the ratio of time of one rotation of welding tool 16 to the speed of advance of the web of material 10 remains constant so that, for all speeds of DC motor 26, the distances between the welding points on the web of material 10 remain the same. The only change resulting from changing the speed of DC motor 26 is a change in the welding time. It is therefore possible to adjust the welding time to a value suitable for a given web of material by regulating the speed of rotation of DC motor 26.

The use of worm gearing 29 reduces non-uniform loading on DC motor 26 produced by non-uniform rotational speed of driven shaft 45 of transfer gearing 41 to a negligibly small amount.

In the embodiment shown, the supports of the guide rod 61 and of the crank arm are developed as disks 59 and 64 respectively. However, these two parts can also be formed of balanced arms extending diametrically to the slot arm shaft 42 and the crank shaft 43 respectively.

The present invention is particularly adapted to separation welding of a web of thermoplastic material folded together into a U-shape along one of its longitudinal lines. Bags may thus be formed by transverse welding in which the side seams of the bags are formed by welding and the bags are separated from the web. The apparatus is also effective for cutting single-layer thermoplastic sheets into sections of the same length without welding or, alternatively is capable of welding without separating in a web such as a flat composite sheet tube which bears a thermoplastic layer on its inner side. Such a composite sheet tube provided with transverse weld seams by the apparatus of the present invention can be separated in a subsequent operation into individual bags by means of a knife which cuts the weld seams.

Although automatic control of the gearing of controllable ratio gearing 33 to match the speed of feed rollers 11 and 12 to the speed of welding tool 16 at the instant of welding is employed in the illustrative embodiment described in the preceding, it would be clear to one skilled in the art that manual or semi-automatic adjustment of such gearing would be equally within the scope of the present invention.

What is claimed is:

1. Apparatus comprising:
   means for moving a web at a substantially uniform speed;
   a tool disposed transverse to motion of said web;
   means for driving said tool in a rotational path at a cyclically non-uniform angular velocity, said rotational path being effective to contact said web with said tool once per rotational cycle thereof; and
   control means for controlling said substantially uniform speed to a speed substantially equal to a speed of said tool when said tool contacts said web.

2. Apparatus according to claim 1, wherein said tool includes a welding tool.

3. Apparatus according to claim 1, wherein said tool includes a separation tool.

4. Apparatus according to claim 1, wherein said means for moving includes:
   controllable ratio drive means for controlling said substantially uniform speed;
   first sensing means for sensing a speed of said controllable ratio drive means to produce a first signal;
   second sensing means for sensing a speed of said means for driving when said tool is in contact with said web to produce a second signal; and
   means for adjusting a ratio of said controllable drive means in response to said first and second signals to minimize the difference therebetween.

5. Apparatus according to claim 1, wherein said means for driving includes means for adjusting a ratio between a maximum and a minimum angular velocity of said tool.

6. Apparatus according to claim 1, which further includes a worm gear, a common drive driving said worm gear, and means for actuating both said means for moving and said means for driving from said worm gear.

7. Apparatus according to claim 1, wherein said control means includes a control circuit, and a servomotor controllable by said control circuit operative to adjust said substantially uniform speed to equal the minimum speed of said tool.

8. Apparatus according to claim 7, wherein said control circuit includes a first and a second tachogenerator operative to produce first and second signals which are dependent on the speed of said tool and the speed of said moving web respectively, a scanning and holding circuit operative to store as a third signal only that value of said first signal corresponding to the speed of said tool during contact of said tool with said web, means for comparing said second and third signals to produce a difference signal, said servomotor being responsive to said difference signal to adjust said control means in a sense to minimize said difference signal.

9. Apparatus according to claim 8, further comprising a switch having an open and a closed condition, said switch being operative to disable said servomotor when in its open condition, and means for placing said switch in its open position coincident with contact of said web with said tool.

10. Apparatus according to claim 1, wherein said control means includes means for automatically adjusting said substantially uniform speed.

11. Apparatus according to claim 1, further comprising a controllable speed motor, and means for coupling said motor to said means for moving and said means for driving.

12. Apparatus according to claim 1, wherein said control means includes a conical-pulley controllable ratio gearing.

13. Apparatus for operating on a web comprising:
   means for moving said web at a substantially constant speed in a longitudinal direction thereof;
   a welding tool;
   means for rotating said welding tool in a circumferential path contacting said web at a non-uniform rotational speed;
   said means for rotating is a rotating slot-and-crank mechanism having a slot arm connected to a uniformly rotating shaft and a crankshaft connected to said welding tool;
   said slot arm including a guide rod arranged diametrically to said uniformly rotating shaft, a slide block on said guide rod and a crank pin fastened to said slide block;
   said crankshaft being rotatably supported in a bearing, said bearing being supported in a machine frame, and means for displacement of said bearing perpendicular to its axis and for locking said bearing in place;
   a telescoping universal-joint shaft connecting said crankshaft to said welding tool; and
   said means for displacement including at least one guide rod, an adjustment spindle, an adjustment nut rotatable but axially nondisplaceable in said machine frame, said bearing being connected to said adjustment spindle and slideably disposed on said guide rod, threaded means connecting said adjustment nut and said adjustment spindle for relative movement therebetween and a servomotor for rotating said adjustment nut.

14. Apparatus for operating on a web comprising:
   means for moving said web at a substantially uniform constant speed in a longitudinal direction thereof;
   a welding tool;
   means for rotating said welding tool in a circumferential path at a non-uniform rotational speed including a maximum rotational speed and a minimum rotational speed and for contacting said web with said welding tool at a rotational speed smaller than said maximum rotational speed, whereby said welding tool accelerates when leaving said web;
   first means for sensing said constant speed;
   second means for sensing said minimum rotational speed; and
   means responsive to said first and second means for sensing for adjusting a ratio of said maximum rotational speed to said minimum rotational speed to coincide said minimum rotational speed to said constant speed.

15. Apparatus according to claim 14, wherein said rotational speed for contacting said web with said welding tool is said minimum rotational speed.

16. Apparatus according to claim 14, wherein said means for rotating said welding tool at a non-uniform rotational speed includes means for adjusting a ratio between a maximum and a minimum angular velocity of said tool.

17. Apparatus comprising means for moving a web at a substantially uniform speed, at least one face of said web being of thermoplastic material, said web being folded once around a longitudinal line so that said face of thermoplastic material forms the inside of said web, a welding tool disposed transverse to motion of said web, means for driving said tool in a circumferential path at a constant RPM but at a cyclically non-uniform speed changing between a maximum and a minimum value said circumferential path being effective to contact said web with said tool once per rotational cycle thereof at a line of contact when the tool has a speed smaller than said maximum value of said non-uniform speed so that said non-uniform speed of said tool accelerates when said tool comes out of said contact with said web, said means for driving said tool includes means for adjusting a ratio between said maximum and said minimum value of said speed of said tool for adjusting a distance between said lines of contact on said web, control means for controlling said substantially uniform speed of said web to a speed substantially equal to said speed of said tool when said tool contacts said web.

18. Apparatus according to claim 17, wherein said speed of said tool during contact with said web has said minimum value.

19. Apparatus according to claim 17, wherein said welding tool includes a separation tool for separating bags from said web.

20. Apparatus according to claim 17, wherein said means for driving said tool includes a rotating slot-and-crank mechanism, said mechanism having a slot means connected to a uniformly rotating drive shaft and a crank means connected to said tool, said crank means being diametrically adjustable to said drive shaft for adjusting said ratio between said maximum and said minimum value of said non-uniform speed of said tool.

21. Apparatus according to claim 15, wherein said means for driving said tool in a rotational path at a cyclically non-uniform angular velocity is a rotating slot and crank mechanism.

* * * * *